Oct. 4, 1932.  N. W. DORMAN  1,880,894

CONNECTION

Filed Jan. 29, 1931

Inventor
Neal W. Dorman,
By Owen & Owen
Attorneys

Patented Oct. 4, 1932

1,880,894

UNITED STATES PATENT OFFICE

NEAL W. DORMAN, OF TOLEDO, OHIO, ASSIGNOR TO THE TOLEDO MACHINE & TOOL COMPANY, OF TOLEDO, OHIO, A CORPORATION OF OHIO

CONNECTION

Application filed January 29, 1931. Serial No. 512,074.

This invention relates to a connection, and more particularly to a gripping device adapted for heavy duty, as is required for example in the connection between the crank shaft and slide of a power press.

The object of the invention is to provide a connection having a socket for receiving the end of the connecting rod, which is usually threaded, and means associated with the socket for obtaining a powerful grip on the rod which will not work loose.

Figure 1:
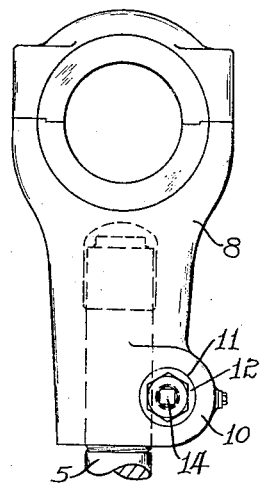
Figure 2:
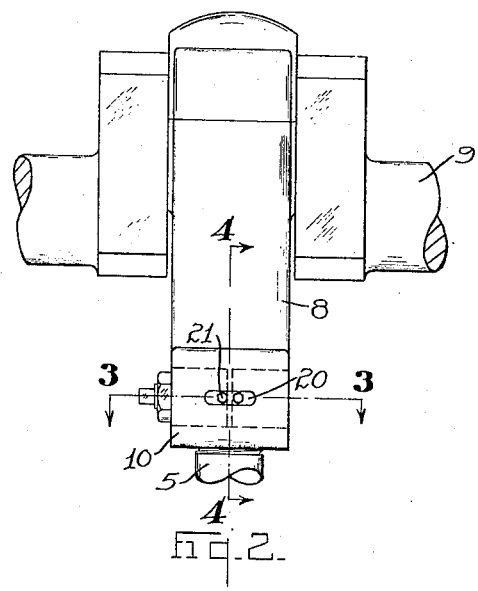
Figure 3:
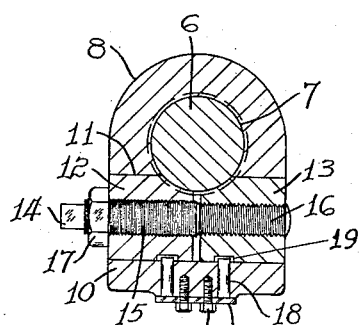
Figure 4:
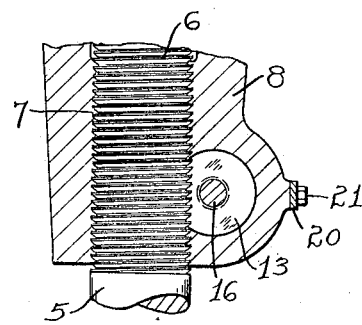

The preferred embodiment of the invention is specifically illustrated in the accompanying drawing, in which:

Fig. 1 is a side elevation of the connection; Fig. 2 is a front elevation thereof; Fig. 3 is an enlarged sectional view taken on the line 3—3 of Fig. 2; Fig. 4 is an enlarged sectional view taken on the line 4—4 of Fig. 2.

As illustrated in the drawing, the connecting rod 5 has a threaded upper end 6 which is received in the correspondingly threaded socket 7 of the member 8 which has a bearing on the crank shaft 9. The lower end of the socket member 8 has a lateral extension 10 which is provided with a transverse bore 11 intersecting one side of the threaded socket 7. Opposed clamping plugs 12 and 13 are adapted to fit within opposite ends of the bore 11 and are machined at the corners which meet the threaded portion 6 of the connecting rod so as to fit the same. When these plugs 12 and 13 are drawn inwardly they wedge against the threaded portion 6 of the connecting rod and clamp the same tightly within the socket 7.

The plugs 12 and 13 have internally threaded bores to receive a clamping screw 14 by means of which they are drawn with great force into clamping relation to the connecting rod. In order to effect this purpose, it is preferred to form the screw 14 with two differentially threaded portions 15 and 16, the plugs 12 and 13 being respectively threaded to correspond to the threading of the two portions of the screw. In order to exert the greatest amount of force upon the plugs 12 and 13, the threads 15 and 16 should run in the same direction, but one should have a greater pitch than the other. When the plugs 12 and 13 have been brought into clamping relation to the connecting rod, the screw 14 may be more effectively held against working loose, if the lock nut 17 is secured thereon.

The provision of the screw 14 with differential threads 15 and 16 running in the same direction not only permits the plugs 12 and 13 to be drawn with tremendous force into clamping relation to the end of the connecting rod but also holds the same so that they cannot work loose. The plugs 12 and 13, however, may be readily separated to release the connecting rod merely by turning the screw 14 in the opposite direction. In order to provide against the possibility that one of the clamping plugs may be released while the other remains tightly wedged against the connecting rod, I have provided stop pins 18 which extend into recesses 19 formed in the plugs 12 and 13 respectively. These stop pins are held in operative position by a plate 20 which is secured to the face of the extension 10 by suitable bolts 21. With these stop pins in the position shown, it will be apparent that when the screw 14 is turned to release the plugs, after one plug is released, it engages one of the stop pins and a further turning of the screw 14 will forcibly release the other plug.

While I have shown and described in detail the preferred embodiment of the invention, it will be understood that the same includes all modifications which may fall within the scope of the appended claims.

What I claim is:

1. The combination with a rod having a threaded end, of a member having a threaded socket receiving the threaded end of said rod and formed with a transverse bore intersecting the socket, plugs adjustable inwardly from the ends of said bore into wedging relation to said rod, the surfaces of the plugs which engage said rod having threads to match the threads of the socket, a screw having successive portions of its shank differentially threaded in the same direction, the respective plugs having alined bores threaded to match said differentially threaded portions of the screw shank and stops disposed in the socket member in position to limit the individual outward movement of each plug.

2. The combination with a connecting member having a threaded end, of a member having a threaded socket receiving the threaded end of said connecting member and formed with a transverse bore intersecting the socket, clamping members in said bore, threaded means for adjusting said clamping members into or out of wedging relation to said connecting member, the surfaces of the plugs which engage the connecting member having threads to match the threads of the sockets and stops disposed in the socket member in position to limit the individual outward adjustment of said clamping members.

3. In a connection, the combination of a member having a slideway, a pair of opposed plugs adjustable in said slideway and having threaded alined bores, the threads of one plug having a different pitch from the threads of the other plug, a screw having successive portions of its shank formed with differential threads matching the threads of the respective plugs, and stops disposed in said member in position to limit the individual outward movement of each plug.

4. In a connection, the combination of a member having a slideway, a pair of opposed clamping plugs adjustable in said slideway and having threaded alined bores, screw threaded means cooperating with the threaded bores to adjust said clamping plugs to or from clamping relation to a member disposed between them, and stops disposed in said first mentioned member in position to limit the individual outward adjustment of said plugs.

5. The combination with a connecting member having a threaded end, of a member having a threaded socket receiving the threaded end of the connecting member and formed with a transverse bore intersecting the socket, plugs in said bore having threads to match the threads of the socket and adapted to engage the threads of the connecting member, a screw having successive portions of its shank differentially threaded, the respective plugs having aligned bores threaded to fit the differentially threaded portions of the screw shank whereby a rotation of the screw in one direction forces the plugs into wedging relation to the connecting member, and stops disposed in the socket member to limit the individual outward movement of each plug whereby a continued rotation of the screw in the opposite direction positively forces both plugs out of their wedging engagement with the connecting member.

6. The combination with a connecting rod, of a member having a socket receiving the end of said rod and formed with a transverse bore intersecting the socket, plugs in said bore, a screw having differentially threaded portions operatively engaging said plugs and rotatable in one direction to force the plugs into wedging relation between said connecting rod and the wall of the bore, and stops limiting the individual outward movement of each plug whereby a continued rotation of the screw in the opposite direction positively forces both plugs out of wedging engagement with the connecting rod.

7. The combination with a connecting member having a threaded end, of a member having a threaded socket receiving the threaded end of the connecting member and formed with a transverse bore intersecting the socket, plugs in said bore having threads to match the threads of the socket and adapted to engage the threads of the connecting member, a screw having successive portions of its shank differentially threaded, the respective plugs having aligned bores threaded to fit the differentially threaded portions of the screw shank whereby a rotation of the screw in one direction forces the plugs into wedging relation to the connecting member, each of said plugs having a recess adjacent the wall of said transverse bore, stop pins extending through the wall of the transverse bore into said recess to positively limit the individual outward movement of each plug whereby a continued rotation of the screw in the opposite direction positively forces both plugs out of their wedging engagement with the connecting member, and means secured to the socket member for locking said stop pins in their stopping relation to the plugs.

8. The combination with a connecting rod, of a member having a socket receiving the end of said rod and formed with a transverse bore intersecting the socket, plugs in said bore, a screw having differentially threaded portions operatively engaging said plugs and rotatable in one direction to force the plugs into wedging relation between said connecting rod and the wall of the bore, each of said plugs having a recess adjacent the wall of said transverse bore, stop pins extending through the wall of the transverse bore into said recesses to positively limit the individual outward movement of each plug whereby a continued rotation of the screw in the opposite direction positively forces both plugs out of their wedging engagement with the connecting rod, and means secured to the socket member for locking said stop pins in their stopping relation to the plugs.

In testimony whereof I have hereunto signed my name to this specification.

NEAL W. DORMAN.